United States Patent [19]

Keramati et al.

[11] Patent Number: 4,757,307
[45] Date of Patent: Jul. 12, 1988

[54] TOOL CONDITION SENSING BY MEASURING HEAT GENERATION RATE AT THE CUTTING EDGE

[75] Inventors: Bahram Keramati, Scotia; Minyoung Lee; William R. Reed, Jr., both of Schenectady, all of N.Y.

[73] Assignee: General Electric Company, Schenectady, N.Y.

[21] Appl. No.: 893,064

[22] Filed: Aug. 4, 1986

[51] Int. Cl.⁴ .............................................. G08B 21/00
[52] U.S. Cl. ...................................... 340/680; 73/104; 364/474
[58] Field of Search ................ 340/680, 584, 588–589; 73/104; 364/474, 557

[56] References Cited

U.S. PATENT DOCUMENTS 3,889,520  6/1975  Stöferle et al. .................... 73/37.5
4,449,085  5/1984  Gomoll .......................... 340/680 X
4,593,277  6/1986  Langan ............................ 340/680

FOREIGN PATENT DOCUMENTS 1212702  2/1986  U.S.S.R. ............................... 340/680

Primary Examiner—Joseph A. Orsino
Assistant Examiner—Thomas J. Mullen, Jr.
Attorney, Agent, or Firm—Donald R. Campbell; James C. Davis, Jr.; Paul R. Webb, II

[57] ABSTRACT

A cutting tool is monitored on-line by measuring the heat generation rate at the cutting edge and relating this to the condition of the cutting edge. A flow of fluid coolant contacts the back surface of the cutting tool and the coolant temperature rise is measured during the machining process. The temperature difference and its rate of rise or fall is a direct indication of the heat generation rate and is related to tool conditions such as excessive and rapid wear and breakage. In the case of inserts, coolant channels are formed in the reusable seat, and tool holder channels provide for flow of coolant to the seat.

17 Claims, 4 Drawing Sheets

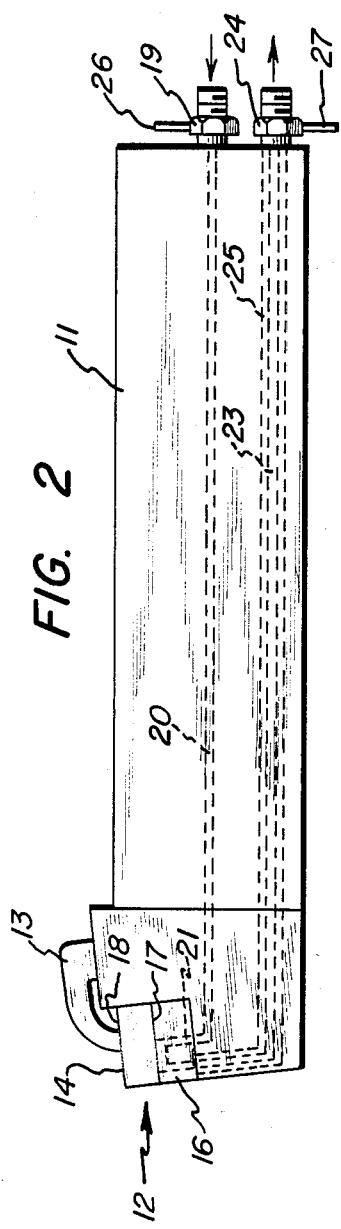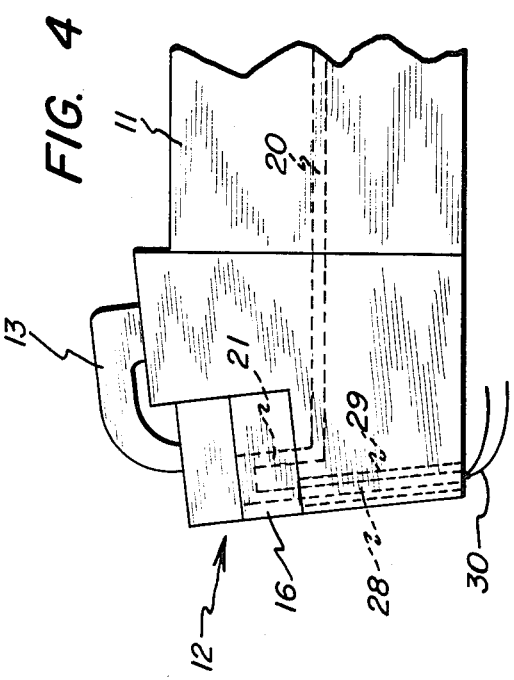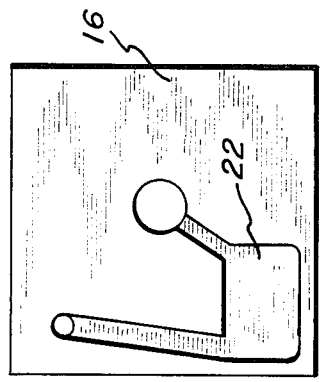

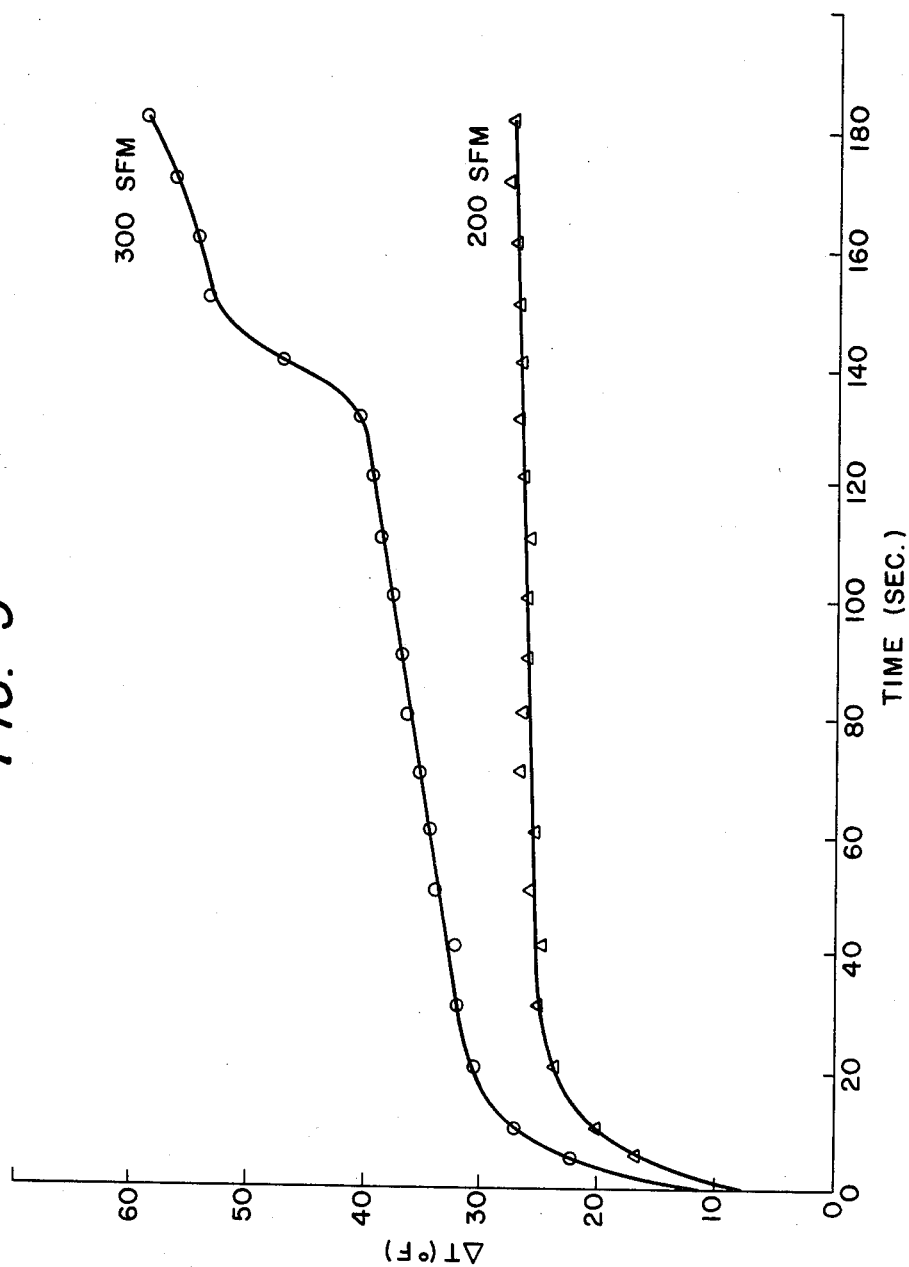

TOOL CONDITION SENSING BY MEASURING HEAT GENERATION RATE AT THE CUTTING EDGE

BACKGROUND OF THE INVENTION

This invention relates to a method and system for on-line sensing of cutting tool condition, such as wear and breakage, by monitoring heat generated by the cutting process.

The quality and accuracy of a machined part is directly related to the condition of the cutting tool and its cutting edge. A cutting tool wears during normal machining operations, and after a prescribed amount of wear it is rendered unsuitable for use. Its continued use may lead to an unacceptable part size, surface finish, and chatter and could lead to tool fracture which jeopardizes the integrity of the workpiece and machine tool. Thus, most numerically-controlled operations require that a prior determination be made of the expected tool life. Tool usage is then programmed not to exceed the allotted time.

Due to inherent tool material, workpiece, and process variations, any prescribed tool life has to be a conservative estimate to minimize the probability of excessive wear on tools. With this operational approach, especially in situations where tool life is limited such as the machining of titanium, the tooling costs will be unnecessarily high. The problem to be solved is the measurement of tool condition during the machining process, and the use of this measurement in the utilization of individual tools to their maximum capability without direct human intervention.

There are a number of systems, based on utilizing different sensors, such as force, acoustic emission, vibration, machine tool feed and spindle drive currents, and tool temperature, that have been advocated as tool condition sensors. Although claims abound that they are successful, there remains a dearth of sensors applicable for the on-line sensing of tool condition. Acoustic tool break detectors, such as the machine tool monitor described in copending application Ser. Nos. 664,188 and 664,189 filed Oct. 24, 1984, now U.S. Pat. Nos. 4,636,780 and 4,636,779, C. E. Thomas et al, address the problem of tool breakage under limited conditions. Systems based on the measurement of machining force have been partially successful for tool wear and tool break sensing but are too costly for routine application and generally require large modifications to the machine tool. One such system has been shown to suffer from long-term reliability due to the wear of bearings through which machining force is measured. Systems based on the measurement of machine tool drive currents, although inexpensive, are difficult to use and are more appropriate for use in transfer-line situations than in flexible manufacturing systems.

SUMMARY OF THE INVENTION

An object of the invention is to provide an improved method of monitoring the condition of the cutting tool during a machining operation that is easy to use and applicable to a broad range of situations.

Another object is to measure the heat generation at the cutting edge, and to exploit the relationship that exists between this measurement and the condition of the cutting edge and tool wear and breakage.

The improved method of sensing cutting tool condition during the machining process comprises providing a flow of water or other fluid coolant which contacts a back surface of the cutting tool and is heated by the heat generated at and near the cutting edge due to chip formation. The temperature difference between coolant inlet and outlet temperatures is measured and is an indication of the heat generation rate at the cutting edge. Tool condition is determined by relating these temperature differences and their rate of change to the condition of the cutting edge. An explanation in relating an increased amount of tool wear to a higher measured temperature difference is that the geometry of the cutting edge changes and there is chipping of the rake and flank faces of the tool, resulting in more contact area and a more efficient thermal contact with the hot chip. A worn tool is indicated by rise of the measured temperature difference above a user set limit; a high rate of rise of temperature difference is evidence of rapid tool wear. A sudden drop of measured temperature difference indicates a tool break. A zero temperature difference designates a not cutting condition, and a positive value of temperature difference a cuting condition.

A further feature of the method of tool condition monitoring is that appropriate commands and alarms are sent to the machine tool controller upon sensing an adverse tool condition, to take suitable action in the machining process.

Another aspect of the invention is an improvement in on-line tool condition sensing systems. The illusrative embodiment is for a replaceable insert that is clamped to a cutting tool seat mounted on a tool holder. The fluid channel for coolant flow includes a central channel section formed in the seat approximately underlying the cutting edge and close to the area over which the chip flows, and entrance and exit channel sections in the tool holder. Temperature sensing means such as a differential thermocouple is provided to measure coolant temperatures in the entrance and exit channels, the latter preferably insulated to prevent heat loss. Means such as a programmed microprocessor interprets and relates the measured temperature difference signal and its rate of change to the foregoing tool conditions and issues commands to the controller.

BRIEF DESCRIPTION OF THE DRAWINGS

FIG. 2 is a side view of a tool holder, seat and cutting insert modified to incorporate the on-line tool condition sensing system of the invention.

FIG. 3 is a plan view of the coolant channel machined into the cutting tool seat.

FIG. 4 is a partial side view of the tool holder, seat and insert, showing an alternate location of the tool holder exit channel for coolant flow.

FIG. 5 shows measured coolant temperature difference curves for two cutting conditions and surface speeds.

DETAILED DESCRIPTION OF THE INVENTION

Figure 1:
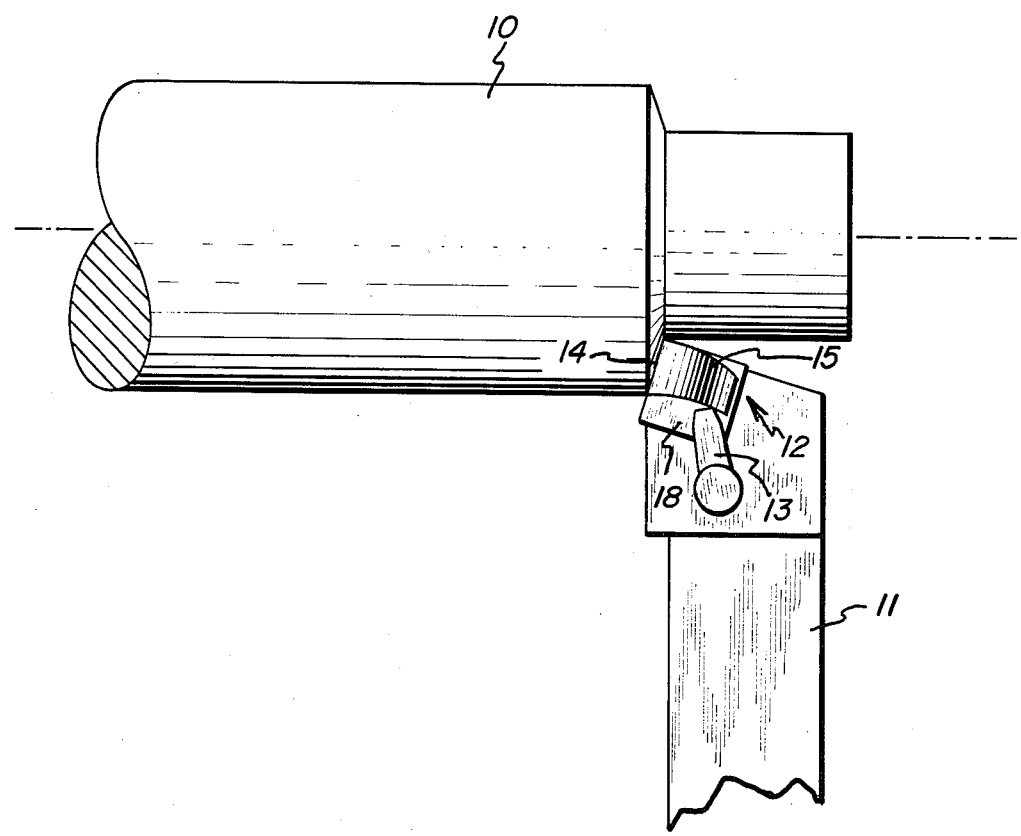
FIG. 1 is a top view illustrating a cutting tool machining a workpiece in a lathe application.

FIG. 1 illustrates the tool condition monitor applied to a turning application using a square cutting insert, where a workpiece 10, tool holder 11, replacable tool insert 12, and cutting tool clamp 13 are seen. In this arrangement, the cutting edge of the cutting tool is indicated at 14 and the chip formed by the machining process at 15. Referring to FIG. 2, the cutting tool 12 is clamped to a reusable cutting tool seat 16 which in turn is mounted on tool holder 11. On-line sensing of tool conditions, such as wear and breakage, during chip formation is accomplished by providing a flow of coolant which contacts the back surface 17 of cutting tool 12, i.e. the surface opposite the rake face 18. The coolant temperature rise is measured during the machining process by suitable temperature sensors. By the proper choice of the coolant passage geometry and coolant flow rate, the measured temperature rise becomes a direct indication of the heat generation rate at the cutting edge. The temperature difference data is interpreted to yield the condition of the cutting edge.

In the case of tool inserts, the cooling channels are machined into the reusable seat 16, and means are provided for the flow of coolant to the seat through the tool holder. The coolant is preferably water but can be machining lubricants, air, or another fluid that convectively removes heat. FIGS. 2 and 3 show one arrangement of the fluid channels. Water is inlet at a quick attach-and-detach fitting 19 and passes into a longitudinally extending entrance channel section 20 in tool holder 11. A central channel section 21 in seat 16 is comprised of a cavity 22 hollowed out of the top of the seat and two holes at either end that extend all the way through the seat. The cutting tool insert 12 rests directly on top of the seat 16, and provides an adequate seal once clamped in the normal manner. The shape and location of the cavity 22 is such that the channel approximately underlies the cutting edge of the cutting tool and is close to the surface over which the chip flows. An exit channel section 23 extends longitudinally through tool holder 11 and discharges water through an outlet fitting 24 plugged into the end of the tool holder. Exit channel 23 is preferably thermally insulated to prevent heat loss from the heated water and is surrounded by an insulating tube 25. The coolant inlet and outlet temperatures are continuously measured by thermocouples 26 and 27 which may be components of a differential thermocouple whose output voltage is the temperature difference signal.

FIG. 4 illustrates a modification of the fluid passages in the tool holder. Exit channel section 28 is straight and does not have a bend as in FIG. 2, and the coolant outlet is at the bottom of the tool holder and discharged water falls into the machine tool pan. The exit channel is surrounded by an insulating tube 29 as before. Outlet thermocouple 30 is located at the end of exit channel 28 and measures the coolant outlet temperature. The embodiment in FIG. 2 is advantageous because the water supply and pump, and the temperature sensors and their wiring, are on the machine tool turrent; the tool holder is easily mounted and replaced by another.

As the cutting tool wears, the inlet and outlet temperature difference of the water or other coolant increases. As the tool wears, the cutting edge geometry changes and pits and craters are formed at the cutting edge on the rake and flank faces of the tool. A worn tool provides more area of contact with the chip as the chip flows over the cutting tool. There is a more efficient thermal contact between the chip and tool as the tool wears. Thus more heat is made available for the water to absorb by contact with the back surface of the tool. The temperature difference data shown in FIG. 5 was obtained in machining a bar of titanium alloy with a carbide cutting tool insert, using ordinary water as the coolant. Two cutting conditions were tested. Both employed a 0.100 inch depth of cut, and a feed rate of 0.010 inch/revolution of the workpiece. One test was conducted at a cutting speed of 200 surface ft/min., and the other at 300 surface ft/min. The temperature rise in the water was measured continuously during the two cuts, each lasting about three minutes. The test conducted at lower speed shows a very slowly increasing temperature difference, after the initial fast transient. This indicates that the heat that is generated at the cutting edge is slowly increasing. The test at the higher cutting speed indicates a larger rate of heat generation, as measured by the increased temperature difference, and also, a larger rate of heat generation rate increase through the cut. All these observations are consistent with the known patterns of tool wear. The non-uniform wear observed at the higher cutting speed is also manifested by dramatic changes in the slope of the temperature difference curve. These slope changes are attributed to changes in the contact geometry between the tool and the chip as a result of chipping on the rake and flank faces of the tool.

The following tool conditions are indicated by the measured temperature differences; this is not a complete list but includes adverse tool conditions that are normally monitored. A sensed temperature difference that exceeds a high value and rises above a user set limit indicates a worn tool. A high rate of rise of the sensed temperature difference indicates rapid tool wear. The amount of tool wear, it is realized, is established by previous tests that relate the degree of wear and temperature rise. A sudden drop in measured temperature difference is an indication of a tool break. Moreover, the coolant pressure can be monitored in the turret; a sudden decrease could be caused by a large break that unseals the coolant channel in the seat. A zero temperature difference signals a not cutting condition. A positive temperature difference means that the tool is engaged in the cut.

Figure 6:
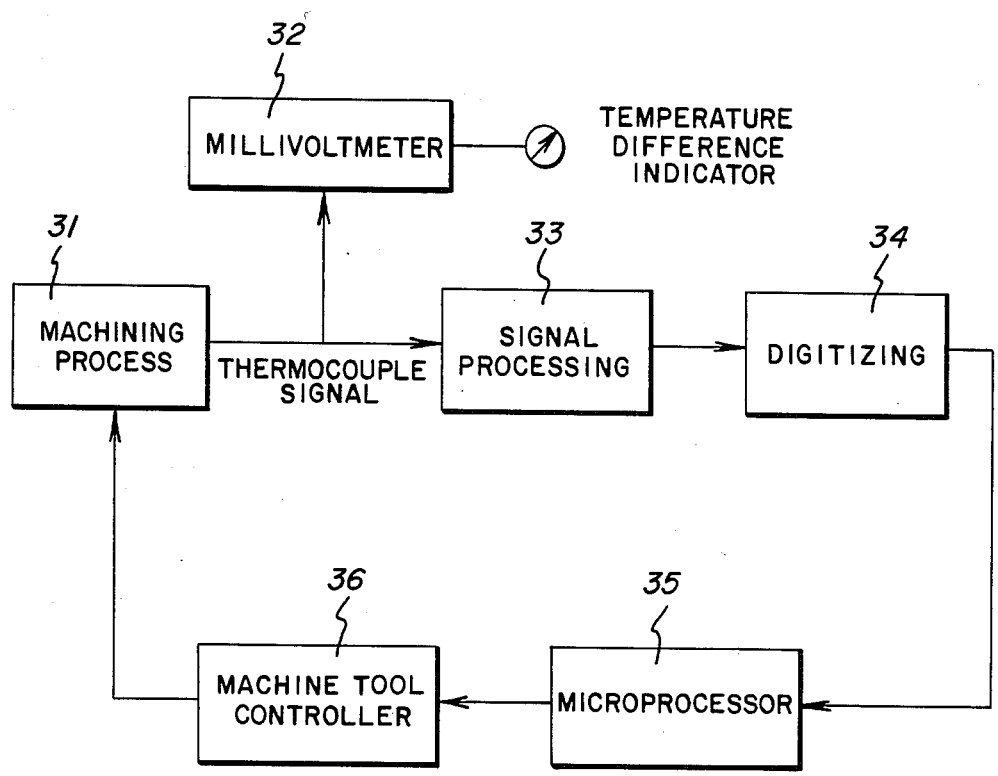
FIG. 6 is a system block diagram and illustrates the processing and utilization of the temperature difference signal.

A system block diagram for the on-line tool condition sensing system is given in FIG. 6. The machining process designated generally by block 31 supplies a thermocouple signal which varies with the sensed temperature difference. The generated EMF is uniquely related to the rise in coolant temperature as it flows through the channel 21 in tool seat 16. A millivoltmeter 32 equipped electronically with appropriate scaling of the output can be provided to display visually the actual value of the temperature rise in appropriate units (°F. or °C.). This same EMF, after appropriate signal processing and digitizing at 33 and 34, is monitored by a microprocessor 35 which is programmed to interpret the thermocouple signal and sensed temperature difference, and relate this to tool condition. This program can have a number of adjustable and easily-set parameters that allow the adaption of this sensor system to many tool condition monitoring applications. Microprocessor 35 is also programmed to issue one or more alarms to the machine tool controller 36. Alarms are generated, for instance, upon sensing a worn or broken tool. These alarms, in turn, are interpreted by the controller as triggers to take appropriate actions on the machining process. The relationship between the monitored temperature difference and tool condition is dependent upon the machining process, which includes the workpiece material, tool material and geometry, the type of cut, and the actual machining conditions (feed, speed and depth of cut).

The improved tool condition monitoring system and method are applicable to other machine tools such as milling machines, and to other cutting insert geometries such as round, triangular, diamond-shaped, etc.

While the invention has been particularly shown and described with reference to preferred embodiments thereof, it will be understood by those skilled in the art that various changes in form and details may be made without departing from the spirit and scope of the invention.

The invention claimed is:

1. A method of sensing a condition of a cutting edge of a cutting tool during a machining process comprising:
   providing a flow of fluid coolant in a channel from an inlet to an outlet thereof which contacts a surface of said cutting tool and is heated by heat generated at and near said cutting edge due to chip formation;
   measuring the temperature difference between coolant inlet and outlet temperatures which is a direct indication of the heat generation rate at said cutting edge; and
   determining from said temperature difference and its rate of change the condition of said cutting tool.

2. The method of claim 1 wherein said cutting tool is a replaceable insert and said coolant is water whose flow contacts a back surface of said insert.

3. The method of claim 1 wherein a worn tool is indicated by a value of said temperature difference above a user set limit.

4. The method of claim 1 wherein a high rate of rise of said temperature difference indicates rapid tool wear.

5. The method of claim 1 wherein a sudden drop of said temperature difference is an indication of a tool break.

6. The method of claim 1 wherein a zero value of said temperature difference indicates a not cutting condition.

7. The method of claim 1 wherein a positive value of said temperature difference is an indication of a cutting condition.

8. An improved method of sensing, during a machining process, a condition of a cutting tool which is secured to a seat mounted on a tool holder, comprising;
   providing a channel having an inlet and an outlet which passes through said tool holder and seat beneath said cutting tool approximately underlying a cutting edge thereon;
   circulating liquid coolant through said channel which is heated by heat generated at said cutting edge as a chip is formed;
   measuring coolant temperatures at the channel inlet and outlet and continuously deriving the temperature difference thereof and its rate of change; and
   relating the condition of said cutting tool to said measured temperature difference.

9. The method of claim 8 further including issuing an appropriate command to a machine tool controller upon sensing tool conditions such as excessive or rapid tool wear, tool breakage, not cutting and cutting.

10. The method of claim 8 further including generating an alarm when said measured temperature difference exceeds a preset limit indicating a worn tool.

11. The method of claim 8 further including generating an alarm upon a sudden drop in said measured temperature difference due to a broken tool.

12. An improved on-line tool condition sensing system comprising:
    a cutting tool which has a cutting edge and is clamped to a seat mounted on a tool holder;
    channel means for liquid coolant flow that contacts a back surface of said cutting tool and is heated by heat generated at said cutting edge during a machining operation and chip formation, said channel means including entrance and exit channel sections in said tool holder and a central channel section in said seat;
    temperature sensing means to measure coolant temperatures in said entrance and exit channel sections and determine the temperature difference thereof which is an indication of the heat generation rate at said cutting edge; and
    means to relate said temperature difference and rate of change thereof to the condition of said cutting tool.

13. The system of claim 12 wherein said central channel section is comprised of a cavity hollowed out of a top portion of said seat that is sealed by the back surface of said cutting tool.

14. The system of claim 12 wherein said exit channel section is surrounded by thermal insulation.

15. The system of claim 13 wherein said entrance and exit channel sections extend longitudinally through said tool holder and have an inlet and outlet, respectively, at an end of said tool holder.

16. The system of claim 12 wherein said temperature sensing means is a differential thermocouple.

17. The system of claim 12 wherein said last-mentioned means is a microprocessor programmed to interpret said temperature difference as tool conditions such as excessive wear, rapid wear, tool break, not cutting and cutting, and to issue appropriate commands to a machine tool controller.

* * * * *